Figure 1:
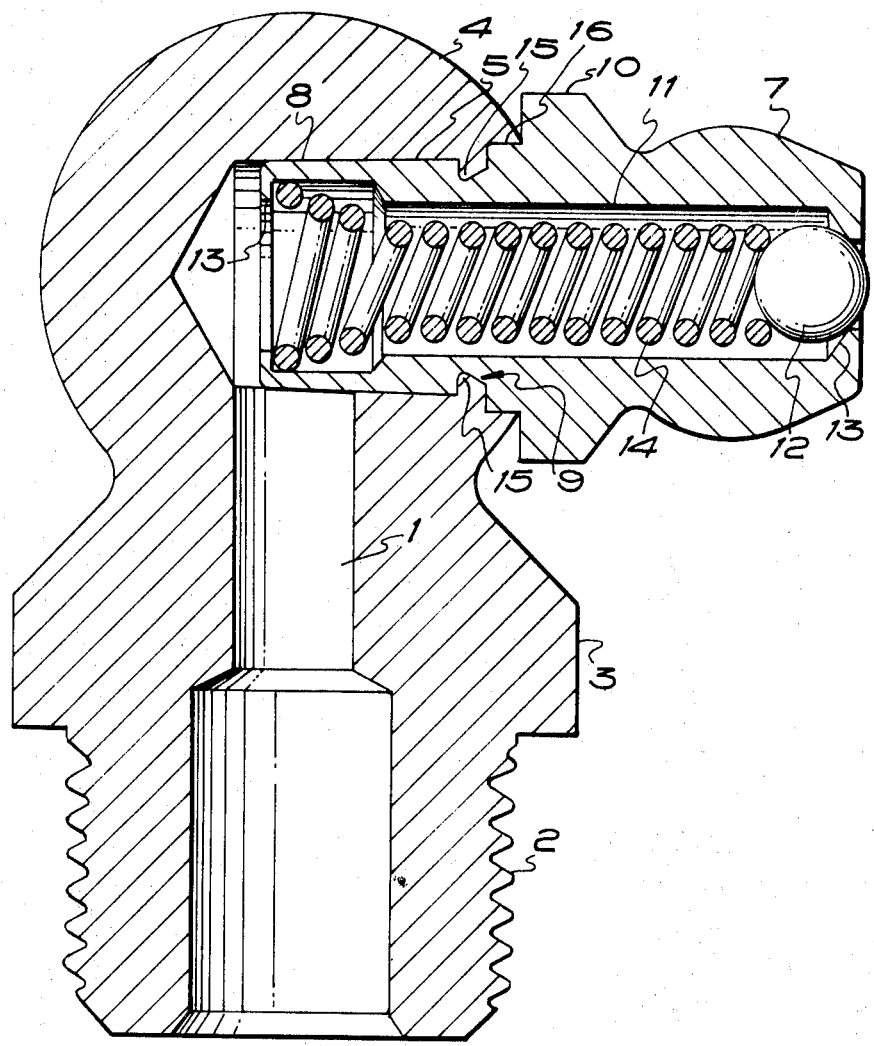
Figure 2:
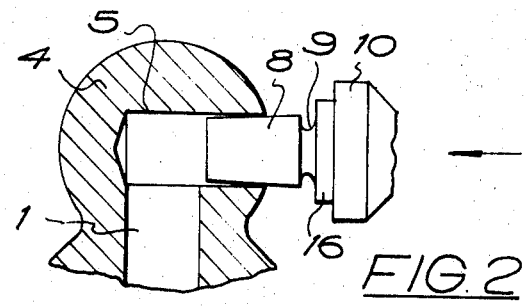
Figure 3:
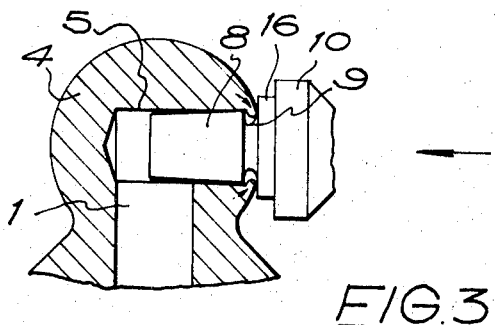
Figure 4:
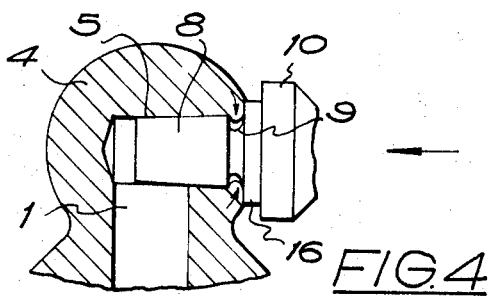
Figure 5:
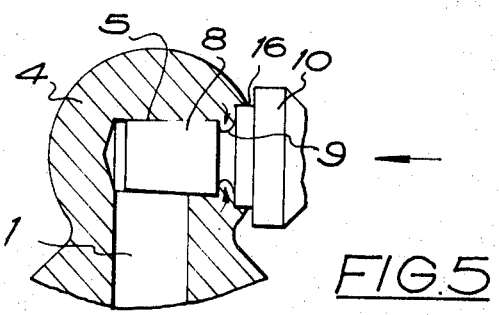

United States Patent

[11] 3,568,800

| [72] | Inventor | Adrian K. Fisher<br>Leeds, England |
| [21] | Appl. No. | 850,993 |
| [22] | Filed | Aug. 18, 1969 |
| [45] | Patented | Mar. 9, 1971 |
| [73] | Assignee | Kingfisher (Lubrication) Limited<br>Leeds, England |
| [32] | Priority | Mar. 16, 1966 |
| [33] | | Great Britain |
| [31] | | 11467/66 |
| | | Continuation-in-part of application Ser. No.<br>622,770, Mar. 13, 1967, abandoned. |

[54] GREASE GUN NIPPLE ASSEMBLY
3 Claims, 5 Drawing Figs.

[52] U.S. Cl. ................................................. 184/105,
151/41.73
[51] Int. Cl. ..................................................... F16n 21/02,
F16b 39/00
[50] Field of Search ........................................ 151/41.73;
285/382; 184/105, 105 (B)

[56] References Cited
UNITED STATES PATENTS

| 1,946,064 | 2/1934 | Creveling ..................... | 285/382X |
| 2,913,820 | 11/1959 | Barth ............................ | 151/41.73X |
| 3,079,970 | 3/1963 | Barry ............................ | 151/41.73 |

FOREIGN PATENTS

| 1,048,448 | 1/1959 | Germany ..................... | 184/105 |

Primary Examiner—Manuel A. Antonakas
Attorney—Abraham A. Saffitz

ABSTRACT: A grease gun nipple assembly comprises a body adapter of relatively soft material with a bore extending through it, and a nipple of relatively hard material engaged frictionally at one end of the bore. An axial through passage in the nipple communicates with the bore so that, when a grease gun engages the nipple, grease be passed along the bore of the adapter and the axial passage of the nipple. When the nipple, which has means defining an annular groove, and the adapter are fitted together, an annular ledge with a tapered surface is deformed out of the material of the body adapter and this annular ledge engages the nipple groove which is higher at the rear of the nipple than at the front, to aid in force fitting the nipple into the bore of the body adapter by filling the nipple groove, the depth of the groove increasing in the direction in which the nipple is pushed into the bore.

INVENTOR
A. K. FISHER
BY [signature]
ATTORNEY

GREASE GUN NIPPLE ASSEMBLY

This invention is a continuation-in-part of my copending application, Ser. No. 622,770, filed Mar. 13, 1967; now abandoned.

The invention relates to a grease gun nipple assembly comprising a body adapter and a grease gun nipple frictionally fitted together, and to a method of fitting the adapter and nipple together.

The conventional grease gun nipple assemblies are furnished with spring-loaded ball valves which occupy certain positions in relation to the bore of the assembly through which the grease is passed and the nipples are generally formed with an externally screw threaded shank at the base thereof to screw into an internally screw-threaded bore at the top portion of the body adapter. This screw-threaded joint tends to leak.

It is one object of the present invention to provide a new grease gun nipple assembly wherein the screw-threaded attachment of the nipple head is obviated, and at the same time a very effective leakproof seal is achieved, and a method of erecting such assembly.

According to the invention, there is provided in a grease gun nipple assembly comprising a body adapter of relatively soft material, means defining a bore which extends through said adapter, a grease gun nipple of relatively hard material frictionally engaged in said bore at one end thereof, means in said nipple defining an axial through passage communicating with said bore so that grease from a grease gun engaging said nipple can be passed along said axial passage and the bore of the adapter, a deforming shoulder on said nipple, means in the nipple defining an annular groove, and a ledge of material deformed out of the body adapter by the deforming shoulder during the fitting together of the nipple and adapter, and filling said groove to assist in holding together said body adapter and nipple the improvement that the depth of the groove increases in the direction in which the nipple is pushed into the bore.

Preferably, the part of the nipple frictionally engaged in the bore is a tapered shank to enable same to be located readily in the bore for subsequent interference fitting, and this narrowed structure adapts the forcible entrance of the rear of the nipple into the body adapter. This forcible entrance must accomplish a deformation and radial flow of the material of the body adapter into the annular recess of the nipple head to define said ledge. The aforementioned ledge thus fits so tightly as it is forced in under pressure and with the forward angled edge of the recess, based on a wedging action, that it effectively prevents rotation and leakage of the nipple assembly despite extreme hydraulic stress imparted by grease under pressure which is dispensed through the assembly. The adapter body is of a material which is sufficiently elastic as to distort under the force fitting of the nipple.

Also according to the invention there is provided a method of erecting a grease gun nipple assembly from a body adapter of relatively soft material and having a through bore, and a grease gun nipple of relatively hard material having a shank portion adapted to be an interference fit in said bore, the method comprising providing on said nipple, a deforming shoulder at the end of the shank portion and an annular groove in the shank portion of which the depth increases in the direction away from the end of the nipple adapted to be attached to the grease gun, and forcing the shank portion into the bore in the adapter body such that the material of the body defining the bore is caused to deform by the deforming shoulder and flow into the said groove to effect a sealing together of the nipple and adapter.

An embodiment of the invention will now be described, by way of example, with reference to the accompanying drawings, wherein:

FIG. 1 shows a sectional side elevation of a grease gun nipple assembly constructed according to the invention; and FIGS. 2 to 5 show in steps, the method of construction for the assembly of FIG. 1.

In the accompanying drawings, the adapter body of the appliance has a through bore made up of an axial bore section indicated at 1 and a radial bore section 5 intersecting with said axial bore section 1. The adapter is externally screw-threaded at 2 and is provided with a hexagonal part 3 and a spherical domed end 4.

The nipple of the assembly has a suitably shaped outer end 7 for engagement with a grease dispenser head an an inner shank 8 with an annular recess 9, between which portions there is provided a hexagonal projecting part 10 and a deforming cylindrical shoulder portion 16. The shank 8 is slightly tapered to permit easy insertion and location in the radial bore section 5. The hexagonal projecting part 10 the nipple can be inserted into the adapter body and to aid in preventing rotation of the head and body parts once they have been force fitted together.

An axial passage 11 in the nipple through which the grease, in use, passes, is adapted to house a spring-loaded ball 12 which coacts with the outer end of the nipple, the nipple at the ends of the passage 11 being contoured as at ends 13 to position and retain said ball 12 at one end and the coacting spring 14 at the other end.

The aforesaid adapter body and nipple head are united as shown clearly in FIGS. 2 to 5 by inserting the inner shank end 8 of the nipple head into the radial bore section 5 in the spherical end 4 of the adapter body 1 and thereafter applying pressure with the aid of a suitable tool or die whereby the shoulder 16 engages and deforms because the body 4 is of relatively soft material such as free cutting mild steel, whilst the nipple is of relatively hard material such as case hardened mild steel, at the radial bore section opening, a lip of material of the body into the recess and so that such deformed lip becomes ledge 15, locked into the annular recess in the shank of the nipple head. Because of the shape of recess 9, i.e., increasing in depth in the direction in which the nipple is pushed into the adapter the smooth flow of deformed material into recess 9 is promoted and enhanced and also the configuration of the resulting ledge 15 is such as to resist any tendency of the nipple to "blow out" of the adapter under high grease pressure.

It must be understood that the aforesaid spring-loaded ball means may be omitted in some examples of nipples according to the invention, for example the shank 8 may be other than hexagonal, e.g. round, triangular, square or of other polygonal shape, and different relatively hard and relatively soft materials may be used for the adapter and nipple.

I claim:

1. In a grease gun nipple assembly comprising a body adapter of relatively soft material, means defining a bore having an inlet and outlet and which extends through said adapter, a grease gun nipple of relatively hard material frictionally engaged in said bore at one end thereof, means in said nipple defining an axial passage communicating with said bore so that grease from a grease gun engaging said nipple can be passed along said axial passage and the bore of the adapter from the inlet to the outlet thereof, a deforming shoulder on said nipple, means behind said deforming shoulder in the nipple defining an uninterrupted annular groove which is placed behind the outlet of said adapter bore, and an annular ledge of material deformed out of the body adapter, by the deforming shoulder during the fitting together of the nipple and adapter, said annular ledge having a tapered surface engaging said groove which is higher at the rear of the nipple than at the front, which aids in force-fitting the nipple into the bore of the body adapter by filling said groove to assist in holding together said body adapter and fitting, the depth of the groove increasing in the direction in which the nipple is pushed into the bore.

2. In the grease nipple assembly, according to claim 1, the improvements that the part of the nipple frictionally engaged in the bore is a tapered shank to enable same to be located readily in the second bore for subsequent interference fitting.

3. In grease nipple assembly according to claim 1, the improvements that the means defining said bore define two bore sections which lie at an angle to and intersect one another.